US005682742A

United States Patent [19]

Sato et al.

[11] Patent Number: 5,682,742

[45] Date of Patent: Nov. 4, 1997

[54] APPARATUS AND METHOD FOR CONTROLLING DRIVING OF A RAM OF A HYDRAULIC CYLINDER OF A HYDRAULIC PRESS EQUIPMENT

[75] Inventors: Yasukazu Sato, Kanagawa; Hirohisa Tanaka, Tokyo; Takeshi Nagata, Aichi, all of Japan

[73] Assignee: Nisshinbo Industries, Inc., Tokyo, Japan

[21] Appl. No.: 651,997

[22] Filed: May 23, 1996

[30] Foreign Application Priority Data

May 23, 1995 [JP] Japan .................................... 7-149651

[51] Int. Cl.$^6$ ................................ F16D 31/00; B30B 1/23

[52] U.S. Cl. .......................... 60/327; 60/428; 100/269.05; 100/269.16; 91/461

[58] Field of Search .............................. 60/327, 428, 249, 60/484; 91/519, 461; 100/269.05, 269.16

[56] References Cited

U.S. PATENT DOCUMENTS

| | | | |
|---|---|---|---|
| 2,666,292 | 1/1954 | Biggert, Jr. | 60/429 |
| 2,790,305 | 4/1957 | Towler et al. | 60/429 X |
| 3,016,005 | 1/1962 | Tomka et al. | 100/269.16 X |
| 4,896,594 | 1/1990 | Baur et al. | 100/269.05 |
| 4,924,671 | 5/1990 | Reinert | 60/428 |
| 5,460,084 | 10/1995 | Otremba et al. | 100/269.05 X |

*Primary Examiner*—Hoang Nguyen
*Attorney, Agent, or Firm*—Kubovcik & Kubovcik

[57] ABSTRACT

Apparatus and method for controlling equipment of driving a ram of a hydraulic press. Four proportional sheet valves PA, PB, TA and TB are connected with a hydraulic circuit, in which a hydraulic cylinder 2 for driving a ram 1, a hydraulic pump 3 and so on are set up, a so as to form a full-bridge hydraulic circuit. A compression proportional sheet valve PAp and a hydraulic pump 40 are connected as a hydraulic power source with high pressure and small flow rate parallel with the sheet valve PA being in the oil supply position side in the hydraulic circuit. An NC controller controls timing of turn-on of the proportional sheet valves PA, PB, TA and TB as well as change of the valves PA and Pap by PWM signal to pilot valves of the sheet valves PA, PB, TA and TB. The valves PA and TB are turned on in the down stroke of the ram 1, the valves PB and TA are turned on in the up stroke of the ram 1, and the valve Pap is turned on in the compression stroke.

4 Claims, 7 Drawing Sheets

APPARATUS AND METHOD FOR CONTROLLING DRIVING OF A RAM OF A HYDRAULIC CYLINDER OF A HYDRAULIC PRESS EQUIPMENT

BACKGROUND OF INVENTION

The present invention relates to an apparatus and a method for controlling driving of a ram of hydraulic cylinder of a hydraulic press equipment.

In an industrial hydraulic system, an electro-hydraulic servo valve, such as a spool valve, is used as an oil pressure control valve in cases requiring its high responsibility and its high controllability. However, there are some cost increasing factors associated with using such a servo valve, because of using higher grade hydraulic systems, of using higher-power hydraulic pumps and motors to complement pressure losses of a servo valve, of power losses by inner leakage of valves, of working oil maintenance and management such as getting rid of dust in the working off.

In recent years, in order to improve some of the above problems, there has been developed a proportional sheet valve with a high speed electro-magnetic valve control, which has characteristics of low inner leakage, of low pressure losses and of having a good advantage of being dust-free in the working oil, and which is able to operate on fluid control continuously by a pulse fluid control method. For example, the maximum control flow rate is 7000 liters per minute, and the response period is 20 milliseconds.

The inventors of the present invention have already proposed a driving control method that in order to operate continuously on speed adjustment control with the hydraulic cylinder driving the ram for a hydraulic press equipment, with speed adjustment control, it is possible to control the oil pressure continuously in ranges of flow rate from small to large, to have a general flow characteristic of being independent from kinds of hydraulic cylinders, and to set up a desired characteristic freely and to change its characteristics by control means such as NC controllers.

This driving control method has been applied to a hydraulic circuit comprising an equivalent bridge hydraulic circuit consisting of many proportional sheet valves to a 4-port spool valve, and to a valve control method that it is able to control individually opening rates and opening-shutting timings of four throttle valves of controlling inlet flow rate and outlet flow rate of actuators by computing system of the computers. It is possible for this driving control method to control the working oil pressure of the actuators, it being difficult for the spool valve. In a case of applying this driving control method to the ram driving control of a oil hydraulic press such as a hydraulic punching press, by supplying with the optimal oil pressure being dependent on condition of loads, it is possible to decrease the driving power in comparison with a conventional full-bridge hydraulic circuit consisting of spool valves.

FIG. 1 shows a cross-section illustration of hydraulic circuit components adopting the control method of the present invention. FIG. 2 shows a cross-section of the proportional sheet valve in the hydraulic circuit shown in FIG. 1. FIG. 3 shows a hydraulic circuit shown in FIG. 1. In the figures, number 1 is a ram, number 2 is a hydraulic cylinder, number 3 is a hydraulic pump, number 4 is motor driving the hydraulic pump, number 5 is an oil tank, and number 6 is a relief valve. A full-bridge hydraulic circuit consisting of four proportional sheet valves PA, PB, TA and TB is set up in a hydraulic circuit made by pipe arrangements linking said components. The proportional sheet valves PA through TB consisting of sheet-formed main valves 7 and pilot valves 8 using PWM control high speed electromagnetic valves are able to control the opening ratios of the pilot valves 8 by a NC controller 9, and to control the oil pressure continuously in ranges of flow rate from small to large, being dependent from the pilot flow rate. A position of a ram 1 is detected by a sensor 10. (FIG. 1 illustrates general concept of sensing positions and an actual sensor is not illustrated.) The position signal y of the ram 1 is fed back to the NC controller 9 to control the proportional sheet valves PA through TB. The ram 1 is able to move downward in FIG. 1 when operating the proportional sheet valves PA and TB. The ram 1 is able to move upward in FIG. 1 when operating the pilot vales PB and TA. Number 11 shown in FIG. 1 is a plate for the punching machining process.

FIG. 2 shows an enlarged cross sectional illustration of components of the proportional sheet valves PA, PB, TA and TB in FIG. 1. The main valve 7 has a P-port and a T-port in a body 12, including a spool 13 in the body 12. The spool 13 forms a feed-back flow channel 15 in a part of a land (its throttling is in series and its width is Wc.) The spool 13 also has a spool balance-spool 16. The feed-back flow channel 15 has an under lap X with a control volume 17 in the body 12.

The pilot valve 8 is a normal closed two-port valve, whose upper body 18 has a yoke 19, a solenoid 20, a plunger 21, a tube 22, a stator 23, and a push-pin 24, and whose lower body 25 has a poppet valve 26, a sleeve 27, a spring 29, and a stopper 30. The pilot valve 8 is able to open and to shut the flow channel between the P-port and A-port by driving the poppet valve 26 by the turn-on-off control of a solenoid 20. The port 31 set up the control volume 17 of the main valve 7 is connected with the P-port of the pilot valve 8.

In the proportional sheet valves PA, PB, TA, and TB consisting of the above mentioned components, under the shutting condition of the pilot valve 8 the supply oil pressure Ps is equal to the oil pressure Pc of the control volume 17 through the feed-back flow channel 15. The proportional sheet valves PA through TB are holding the valve shut-off condition because of the spool 13 being pressed on the valve sheet 32 by the relation of the acting area of the land 14 ( where a cross-section of acting area of the control volume 17 is Ac and a cross-section of acting area of the supply pressure is AP; Ac>As.) Under this condition, the electric power is on the solenoid 20 of the pilot valve 8, the plunger 21 is absorbed into the stator 23, pushing the push pin 24, making the poppet valve 26 open, the oil flowing from the P-port to A-port through the inclined flow channel of the sleeve 27 and the throttle part of the poppet valves 26. Opening the poppet valve 26 of the pilot valve 8, the oil flows out from the control volume 17 of the main valve 7 through the port 31, the oil pressure Pc of the control volume 17 being lower, becoming equal to the off pressure on the acting area of the land part 14 (Pc*Ac=Ps*As), the spool 13 moving leftward in FIG. 1, and holding the valve open.

When the delivery flow rate (the pilot flow rate) Qp from the port 31 of the control volume 17 is equal to the flow rate Qc of the feed-back flow channel 15, the oil pressure acting on the acting area of the land part 14 is balanced again, and the spool 13 stops. When the electric power is off to the solenoid 20 of the pilot valve 8, the poppet valve 26 is returned to the ordinary normal position by the spring 29 and is completely shut off. Therefore the spool 13 of the main valve 7 controls its positioning dependent on the opening ratio of the pilot valve 8, and it is possible to gain a large flow rate Qv in proportional to the pilot flow rate Qp by controlling the pilot flow rate with a small flow rate.

In the conventional spool valve control, there are two fluid resistances because of throttling the flow rate of the oil supply side of the actuator and the same flow rate of the oil delivery side of the actuator. In said full-bridge hydraulic circuit consisting of said proportional sheet valves, it is able to control individually throttle valves consisting of throttles of the full-bridge hydraulic circuit. In cases of controlling turn-on-off systems of the oil supply side valves and of setting up control parameters of each proportional sheet valve to operate on the proportional control with the oil delivery side valves, it is possible to be made up a meter-off control hydraulic circuit of the proportional sheet valves and it has good advantage of controlling inertia load. FIG. 4 shows a setting example of control parameters of each proportional sheet valve. In FIG. 4, PA, PB, TA, and TB are the gains of each proportional sheet valve, respectively, δPB and δTA being the blind zone width of the proportional sheet valves PB and TB, respectively. The present invention is able to apply to one-rod-cylinder with different flow rate characteristic by setting up a gain of each valve. It has a good advantage of decreasing driving power of an actuator because of controlling the actuator with one fluid resistance.

The operation of working strokes of a hydraulic punching press as shown in FIG. 5 will be explained. The working strokes comprise four strokes, (A) an approach stroke to a plate 11, (B) a punching stroke (region enclosed with rectangular frames), (C) a returning stroke, and (D) a holding stroke.

In the stroke A and D, a lead is a sliding friction resistance and an inertia force of a seal. In these strokes, it is necessary for hydraulic power which has characteristics of low pressure and large flow rate. In the punching stroke B, it is necessary for the hydraulic power which has characteristics of small flow rate and high pressure because of the plate 11 being thin. There is a conventional general control method that is a surplus oil flowing to a oil tank 5 through a relief valve 6 in a case of using a hydraulic pump with high pressure and large flow rate as a hydraulic pump 3, that is to control a flow rate by variable displacement hydraulic pump as a hydraulic pump 3, in order to supply hydraulic power in all strokes by one hydraulic power source.

In the former control method, the hydraulic circuit component is simple and in general. It is in defect that the hydraulic consumption power is so large. In the latter control method, it is possible to apply for a forging hydraulic press with one cycle period being so long. It has practically a weak point that it is difficult to control the flow rate in a range from several liters per minute to several liters per minute in short period such as a high-speed hydraulic punching press with its operation period being over 1 kHz per minute.

The purpose of the present invention is to provide a control equipment of a ram driving of a hydraulic oil press equipment and a control method by which it is possible that the hydraulic consumption power using two hydraulic power sources is smaller than one using one conventional hydraulic power source.

SUMMARY OF THE INVENTION

These and other objects have been accomplished by the apparatus for controlling driving of a ram of a hydraulic press equipment of the present invention.

In the apparatus of the present invention, four proportional sheet valves are connected with a hydraulic circuit so as to form a full-bridge hydraulic circuit. One pair of valves operating the down stroke of said ram and the other pair of valves operating the upstroke of said ram. The hydraulic circuit comprises a low-pressure-large-flow-rate hydraulic pump and a hydraulic cylinder to make the ram of the hydraulic press equipment move upward and downward. Each of the proportional sheet valves comprises a sheet-formed main valve and a pilot valve for controlling motions of said main valve. One proportional sheet valve which operates compression stroke in a case of a stamping process and a variable displacement hydraulic pump with high pressure and with small flow rate are connected in parallel with the proportional sheet valve operating the down stroke in the oil supply side. The proportional sheet valves are operated by a control means such as an NC controller. The NC controller provides controls such that, in a case where said ram should be operated with high speed, the hydraulic pump with low pressure and large flow rate is selected as the hydraulic power source, while in case of a machining process with a wide load fluctuation like a stamping process, the variable displacement hydraulic pump with high pressure and with small flow rate is selected as the hydraulic power source.

These and other objects have been accomplished by the method for controlling driving of a ram of a hydraulic press equipment of the present invention. In the method of the present invention, a timing of turn-on of the proportional sheet valve which operates compression stroke is calculated and controlled from a plate thickness of machining work by the control means, so as to make it possible to calculate a load force of the ram in stamping machining process and to control the optimal machining pressure of the work plate by said ram.

DESCRIPTION OF THE PREFERRED EMBODIMENTS

The description of the preferred embodiment of the present invention will be explained hereinafter in detail by figures. In the following description the parts with already mentioned figures are given the common symbols.

Figure 1:
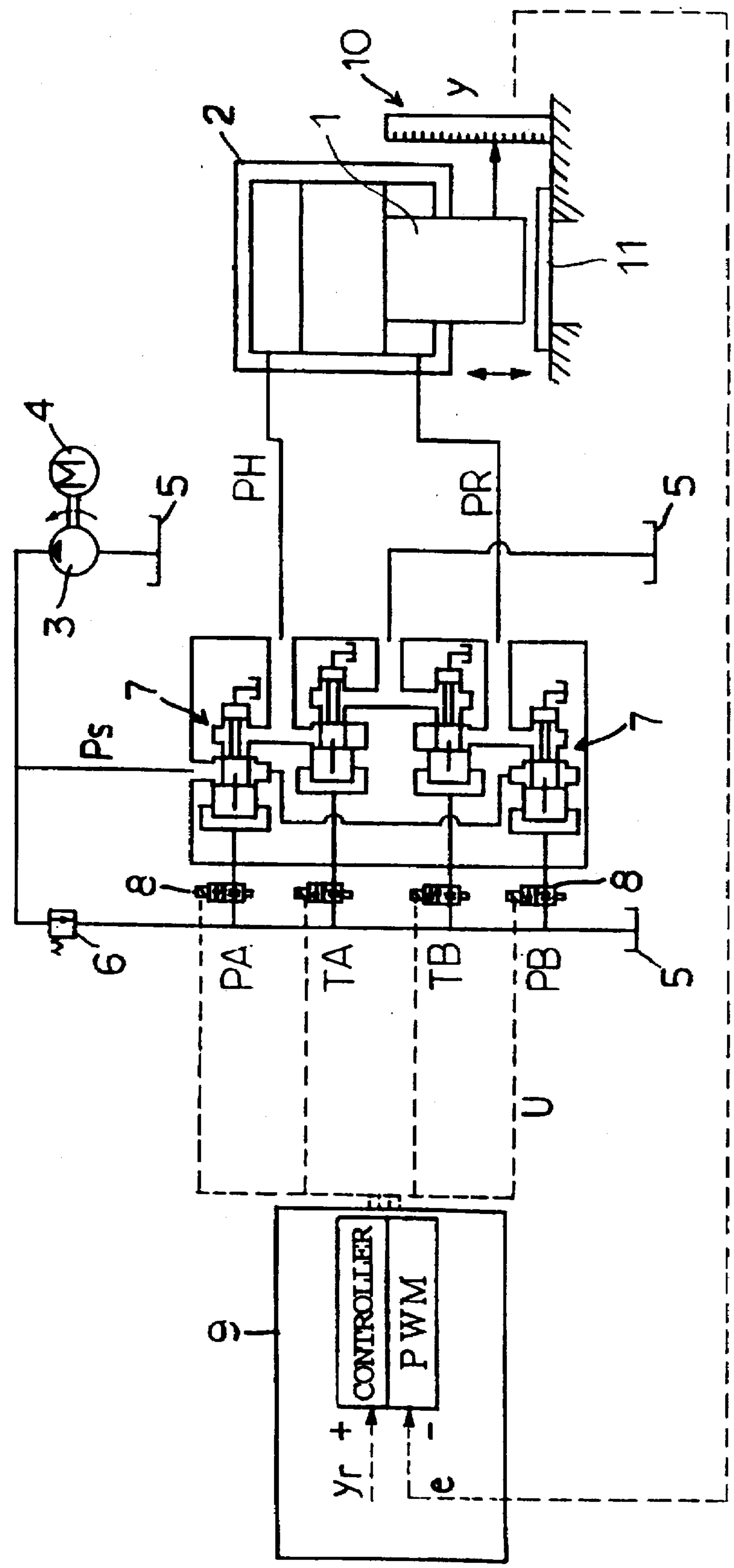
FIG. 1 shows a cross-section illustration of the hydraulic circuit components of the conventional one hydraulic power system comprising four-port spool valves and an equivalent bridge hydraulic circuit consisting of proportional sheet valves.
Figure 5:
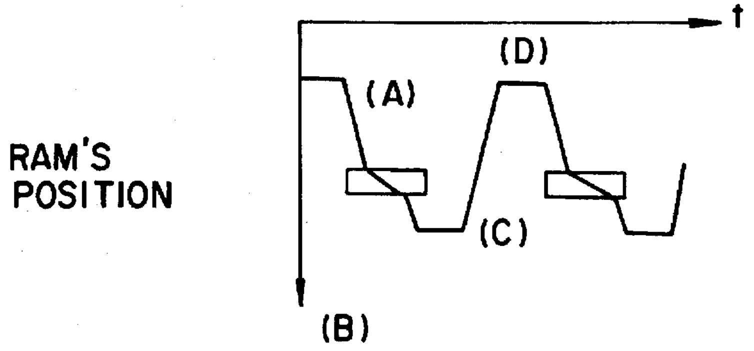
FIG. 5 shows an illustration of the operation strokes for the hydraulic punching press.
Figure 6A:
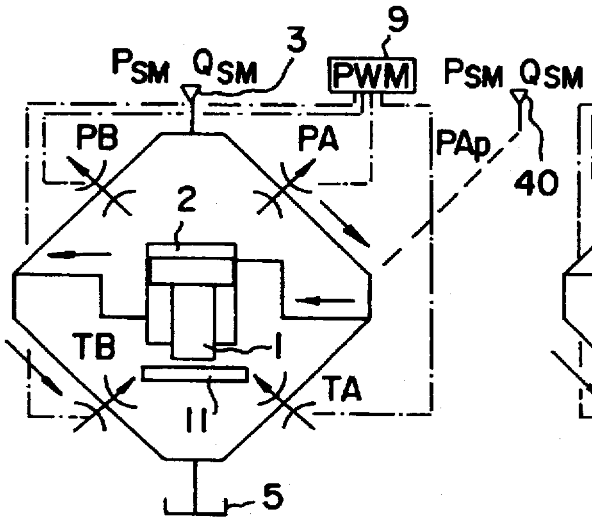
FIGS. 6A and 6B shows a hydraulic circuit of the present preferred embodiment adopting the present invention.
Figure 6B:
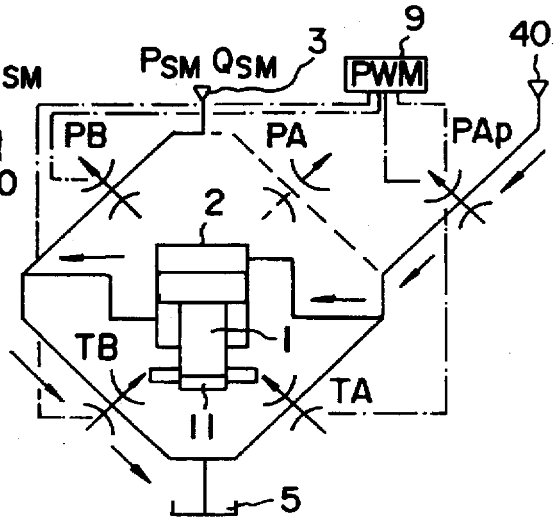

FIG. 6 shows an example of a hydraulic circuit driving control equipment of a ram for a hydraulic press equipment adopting the present invention. The equipment of the present preferred embodiment has a hydraulic power source with low pressure and large flow rate in the strokes A, B, and D in FIG. 5 and has a hydraulic power source with high pressure and with small flow rate in the stroke B. More specifically, the hydraulic circuit in FIG. 1 is provided with a compression proportional sheet valve PAp in the stroke B and a hydraulic pump 40 as a hydraulic power source with high pressure and small flow rate, and has the characteristic of being able to change two hydraulic power circuit lines by the position information of said ram 1. The hydraulic circuit arranges said compression proportional sheet valve PAp and said hydraulic pump 40 in parallel to the proportional sheet valve PA which is in the oil supply position side in the down stroke in FIG. 1.

Figure 2:
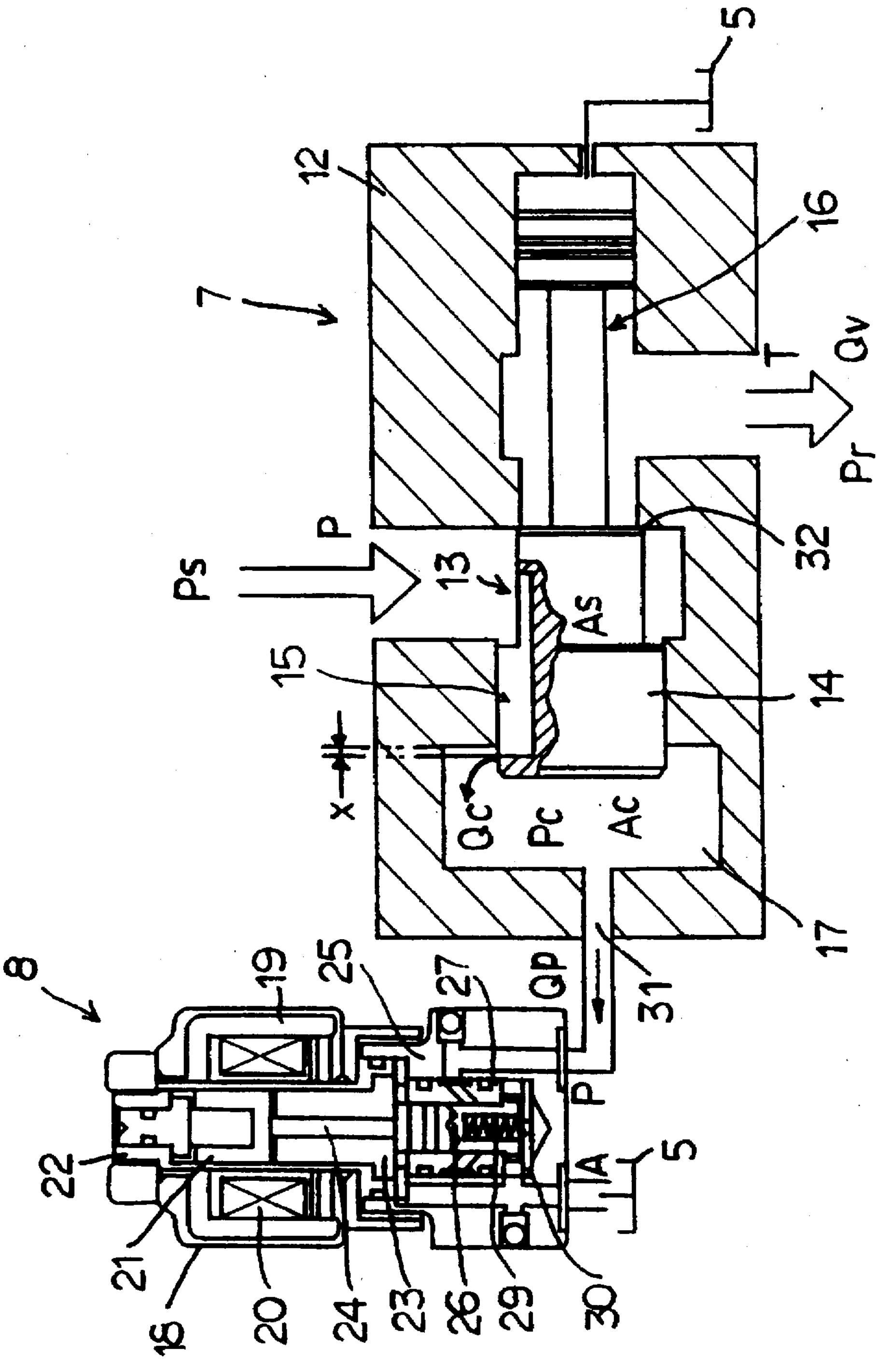
FIG. 2 shows a cross-section of the proportional sheet valve in the hydraulic circuit shown in FIG. 1.
Figure 3:
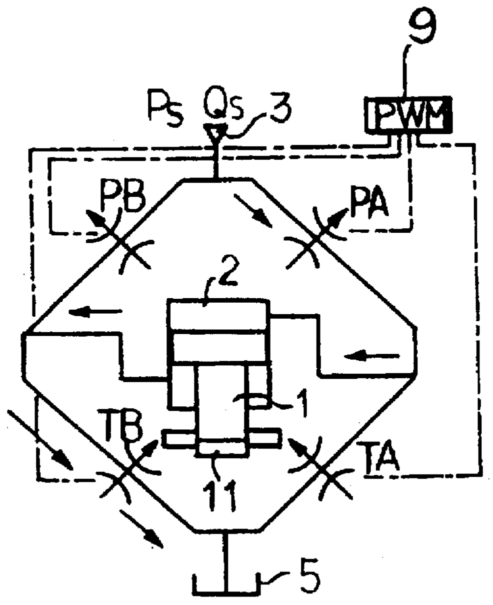
FIG. 3 shows a hydraulic circuit shown in FIG. 1.
Figure 4:
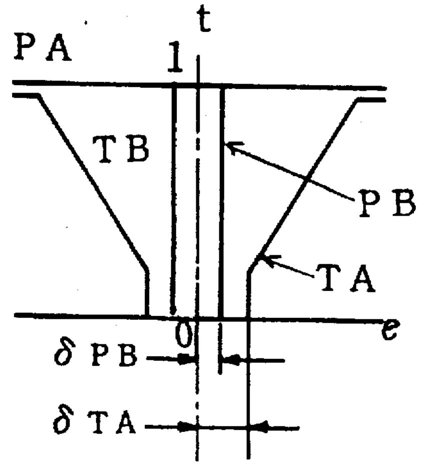
FIG. 4 shows an example of the control parameters of the proportional sheet valves in the hydraulic circuit shown in FIG. 1.

The motion in the down stroke of said ram 1 of the present preferred embodiment is the same operation in FIGS. 1, 2 and 3. In the down stroke of said ram 1 said proportional sheet valve PAp is shut off. In cases of controlling a turn-on-off control system of the proportional sheet valves PB and PA of being in the oil supply position and of controlling a meter-out control system of controlling proportionally the proportional sheet valves TB and TA of being in the oil delivery position side by PWM control, the NC controller 9 selects the proportional sheet valves PA through TB to be open in relationship with the input signal voltage corresponding to the target oil cylinder displacement yr (in a case of the feed back control it is the controlling difference e corresponding to the hydraulic cylinder displacement y) and the modulation ratio output to each pilot valve 8. The NC controller 9 outputs the input signal U as an operation command signal of the exciting circuit of each pilot valve 8 by the I/O port 33. In a concrete form the each pilot valve 8 is controlled by the operation program of the flow chart in steps:

step 1, at first initialize after start;

step 2, input the initial control parameters conditions to the pilot valves 8 of the proportional sheet valves PA through TB, so that the initial setting parameters are a PWM gain, a blind zone width, a PWM control sampling period, and a minimum modulation degree of a threshold.

On the other hand, the change of the hydraulic power circuit line is done by the following. The NC controller 9 outputs the PWM signal to the pilot valve of the proportional sheet valve PAp operating the compression stroke in the range of the stroke B in FIG. 5 instead of the pilot valve 8 of the proportional sheet valve PA in the normal operation. Then the proportional sheet valve PA operating the down stroke is set up to shut off.

Under these above mentioned operation, the total hydraulic consumption power is the sum of hydraulic consumption powers of the hydraulic pump 3 with low pressure and large flow rate and of the hydraulic pump 40 with high pressure and small flow rate. The hydraulic power source of having the low pressure and the large flow rate is used in almost all strokes of the ram 1. Therefore, the hydraulic consumption power is small as compared with the hydraulic consumption power of the conventional one hydraulic power source. The hydraulic consumption power W1 consisting of the conventional one hydraulic power source and the hydraulic consumption power W2 consisting of the two hydraulic power sources adopting the present preferred embodiment are calculated from the following relations, respectively, $$W1=Qs*Ps \qquad \text{(eq. 1)}$$

$$W2=Qsm*Psm+Qsp*Psp \qquad \text{(eq. 2)}$$

where Qs is the delivery flow rate of the hydraulic pump, Ps being the delivery oil pressure of the hydraulic pump( the relief setting oil pressure), the subscript m being the moving stroke of the hydraulic cylinder, the subscript p being the compression stroke of the hydraulic cylinder. In the normal operation, relations $Qs=Qsm$, $Ps=Psp$, $Qsm>Qsp$, $Psp>Psm$, are obtained. Thus the normalized hydraulic consumption power is obtained from the following equation.

$$W2/W1=(Psm/Psp+Qsp/Qsm)<1 \qquad \text{(eq. 3)}$$

As we confirm the useful effect of the driving control equipment and its control method adopting the present invention, we will hereinafter explain the experimental results concerning the hydraulic consumption power of operating on the stamping-out process of the plate, comparing the conventional one hydraulic power source with the two hydraulic power sources adopting the present invention.

The experimental cylinder applies for the ram of the hydraulic punching press (the diameter of the piston being 120 mm, the rod diameter being 100 mm, the maximum stroke being 50 mm, and the mass being 20 kg), stamping out a plate by the circular-formed stamp 20 mm in diameter. In the hydraulic control system using a conventional one hydraulic power source, the hydraulic power supplied from one internal gear pump on its flow rate being 60 liters per minute is controlled by the full-bridge hydraulic circuit consisting of four proportional sheet valves PA, PB, TA, and TB and drives the ram. Hereinafter, this operation system is defined in the operation system 1. In the power-saving hydraulic control system adopting the present invention, the hydraulic power source comprises the hydraulic power source with high pressure and small flow rate consisting of one internal gear pump on its flow rate being 60 liters per minute and the hydraulic power source consisting of the two variable displacement axial piston pump on its flow rate being 4 liters per minute and being fixed. In the stamping process, the full-bridge hydraulic circuit consisting of four proportional sheet valves PAp, PB, TA, and TB in FIG. 6 drives the ram. Hereinafter, this operation system is defined in the operation system 2.

Figure 7:
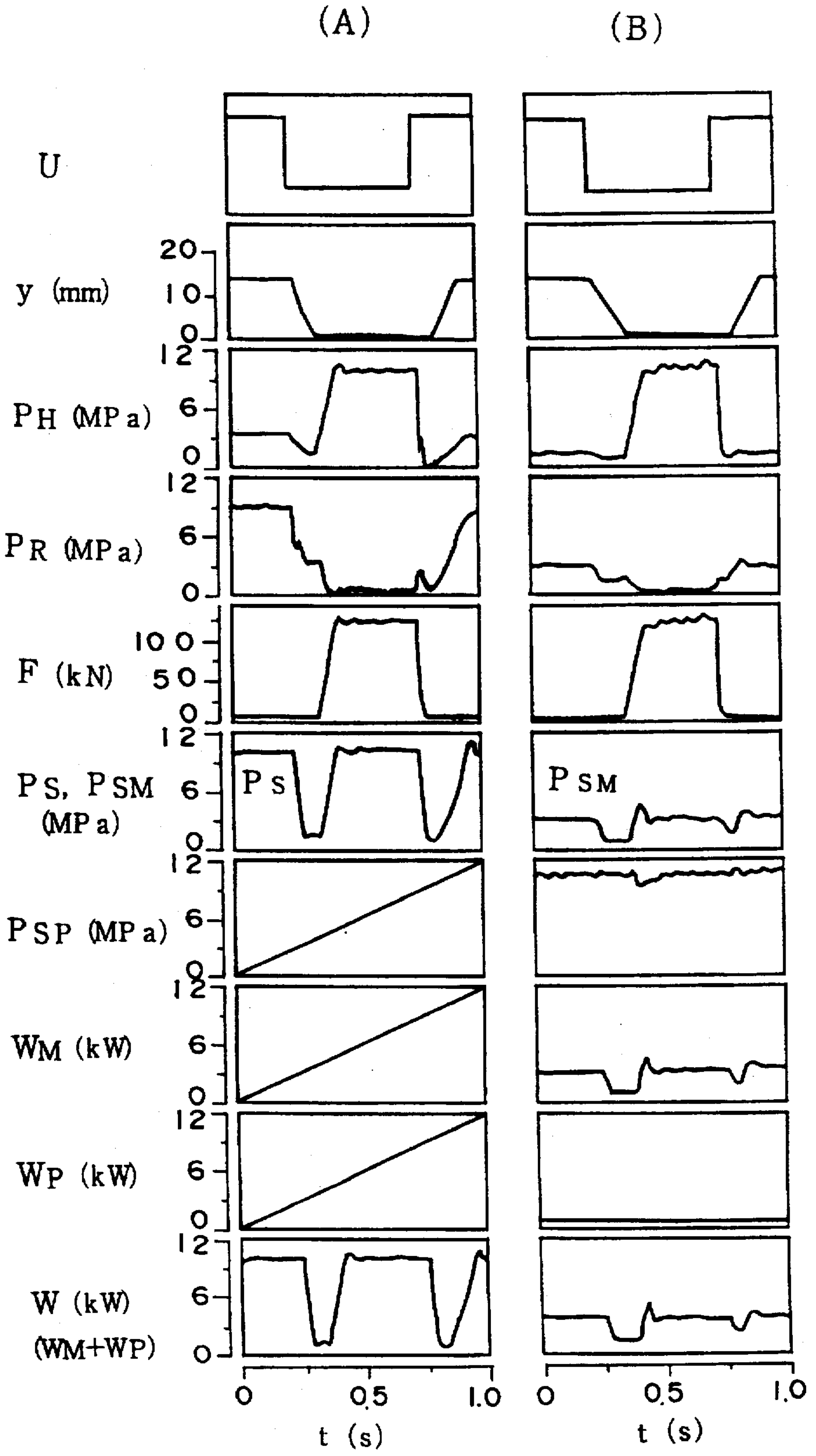
FIGS. 7A and 7B shows experimental results concerning the hydraulic consumption power of operating on the stamping-out process of a plate, comparing the conventional one hydraulic power source with the two hydraulic power sources adopting the present invention.

The experimental results for above operation conditions are shown in FIG. 7. The left side figures (A) in FIG. 7 show the measurement results of the oil pressure Ph of the cylinder head, the oil pressure Pr of the rod, the supply oil pressure Ps, the hydraulic source power W, and the cylinder driving power F, under the conditions of the apparent load generating by acting the piston on the cylinder end (position y=0) instead of stamping out a plate actually using the operation system 1. Here the hydraulic consumption power W and the cylinder driving power F are computed from the following relations, $W=Qs*Ps$, $F=Ah*Ph-Ar*Pr$, where Ah is the side area of the cylinder, Ar being the side area of the cylinder rod. The supply oil pressure Ps (the relief setting pressure) is set up at 10 MPa. As shown in FIG. 7 the maximum hydraulic consumption power is 10 KW and the average hydraulic consumption power is 7 KW.

On the other hand, the measurement results as shown in the right side figures (B) in FIG. 7 are obtained under the conditions using the operation system. The supply oil pressure Psm supplied from high pressure small flow rate hydraulic power source is set up at Psm=3 MPa, and Psp=10 MPa. The experimental results show that the cylinder driving power is equal to the result of the operation system 1, and that the maximum hydraulic consumption power W which is the sum of the cylinder moving hydraulic power and the stamping compression hydraulic power is 4.5 KW and the average hydraulic consumption power is 3 KW, and that the energy consumption adopting the operation system 2 is 40 percent as large as the energy consumption using the operation system 1. On the basis of this result, it is possible that the hydraulic punching press whose driving motor capacity is 22 KW and also 15 KW in the condition of the conventional operation system 1 is driven by the driving motor on its capacity 7.5 KW in the condition using the operation equipment and the control method adopting the present invention.

Figure 8:
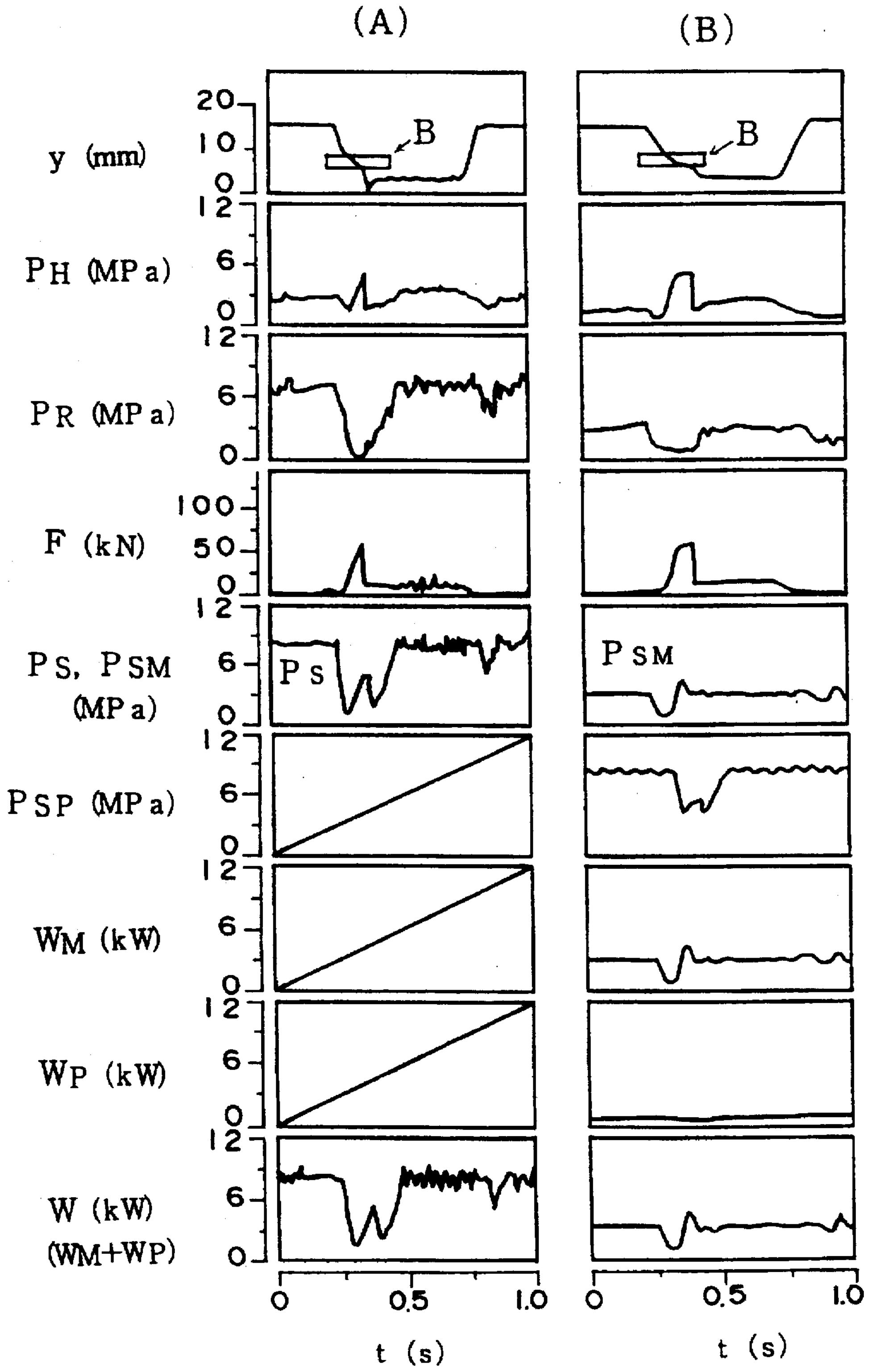
FIGS. 8A and 8B shows experimental results concerning operating on the stamping-out process of a plate, comparing the conventional one hydraulic power source with the two hydraulic power sources adopting the present invention.
Figure 9:
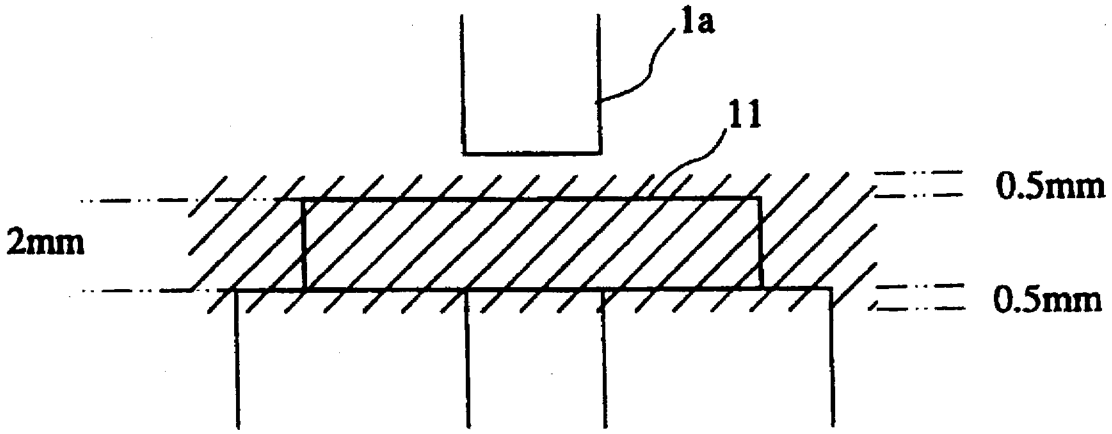
FIG. 9 shows the setting compression area of a driving system consisting of two hydraulic power sources in FIG. 8.

FIG. 8(A) and 8(B) show the experimental results in a case of stamping out a steel plate on 2 mm in thickness by the operation system 1 and the operation system 2, respectively. In the operation system 2, the compression area shown with oblique lines in FIG. 9 is set up because of considering the elastic deformation of the support frame of the hydraulic cylinder acting on by the reaction force of stamping out. The number *1a* in FIG. 9 is the punch part of the leading edge of the ram 1. It is possible to stamp out the steel plate using both of the operation system 1 and the operation system 2. It is clear that in FIG. 8 the cylinder driving power of the operation system 2 is large as the cylinder driving power of the operation system 1.

In the above mentioned preferred embodiment adopting the present invention, a gear pump is used for the low pressure large flow rate hydraulic pump. It is possible to use a vane pump and a piston pump for the low pressure large flow rate hydraulic pump. Especially in a case of operation with a variable displacement hydraulic pump the power efficiency without operation increases. Setting up accumulators with the low pressure large flow rate hydraulic circuit and with the high pressure small flow rate hydraulic circuit respectively (setting up an accumulator with the linkage between the pump and the valve, respectively), it is possible to prevent the initial operation lag in a case of a variable displacement hydraulic pump.

We claim:

1. In an apparatus for controlling equipment of driving a ram of a hydraulic press, wherein four proportional sheet valves are connected with a hydraulic circuit so as to form a full-bridge hydraulic circuit, one pair of valves operating the down stroke of said ram, the other pair of valves operating the upstroke of said ram, said hydraulic circuit comprises a low-pressure-large-flow-rate hydraulic pump and a hydraulic cylinder to make said ram of said hydraulic press equipment to move upward and downward and each of said proportional sheet valves comprises a sheet-formed main valve and a pilot valve for controlling motions of said main valve, the improvement comprising one proportional sheet valve which operates a compression stroke in a case of a stamping process and a variable displacement hydraulic pump with high pressure and with small flow rate connected in parallel with the proportional sheet valve operating said down stroke in the oil supply side, said proportional sheet valves being operated by a control means, said control means providing controls such that, in a case of said ram being operated at high speed, the hydraulic pump with low pressure and large flow rate is selected as the hydraulic power source, while in a case of a machining process with a wide load fluctuation, the variable displacement hydraulic pump with high pressure and with small flow rate is selected as the hydraulic power source.

2. In a method for controlling equipment of driving a ram of a hydraulic press, wherein four proportional sheet valves are connected with a hydraulic circuit so as to form a full-bridge hydraulic circuit, one pair of valves operating the down stroke of said ram, the other pair of valves operating the upstroke of said ram, said hydraulic circuit comprises a low-pressure-large-flow-rate hydraulic pump and a hydraulic cylinder to make said ram of said hydraulic press equipment to move upward and downward and each of said proportional sheet valves comprises a sheet-formed main valve and a pilot valve for controlling motions of said main valve, the improvement comprising:

connecting in parallel one proportional sheet valve which operates a compression stroke in a case of a stamping process and a variable displacement hydraulic pump with high pressure and with small flow rate with the proportional sheet valve operating said down stroke in the oil supply side;

operating said proportional sheet valves by a control means that, in a case of said ram being operated with high speed, selects the hydraulic pump with low pressure and large flow rate as the hydraulic power source, while in case of a machining process with a wide load fluctuation, selects the variable displacement hydraulic pump with high pressure and with small flow rate as the hydraulic power source; and calculating and controlling by said control means, timing of turn-on of said proportional sheet valve which operates a compression stroke from a plate thickness of machining work, so as to calculate a load force of the ram in stamping machining process and to control the optimal machining pressure of said work plate by said ram.

3. The apparatus of claim 1, wherein said machining process with a wide load fluctuation is a stamping process.

4. The method according to claim 2, wherein said machining process with a wide load fluctuation is a stamping process.

* * * * *